United States Patent
Peeters et al.

(10) Patent No.: US 9,384,215 B2
(45) Date of Patent: *Jul. 5, 2016

(54) FILE CREATION METHOD AND SYSTEM

(75) Inventors: Johan Peeters, Bierbeck (BE); Andrew Thomas Yule, East Grinstead (GB); Graham Thomason, Redhill (GB)

(73) Assignee: u-blox AG, Thalwil (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/993,454

(22) PCT Filed: May 15, 2009

(86) PCT No.: PCT/GB2009/050525
§ 371 (c)(1),
(2), (4) Date: Nov. 18, 2010

(87) PCT Pub. No.: WO2009/141642
PCT Pub. Date: Nov. 26, 2009

(65) Prior Publication Data
US 2011/0066667 A1    Mar. 17, 2011

(30) Foreign Application Priority Data

May 22, 2008    (GB) .................................. 0809302.3

(51) Int. Cl.
*G06F 17/30*    (2006.01)
*G01S 5/02*    (2010.01)
*H04W 64/00*    (2009.01)

(52) U.S. Cl.
CPC ......... *G06F 17/30265* (2013.01); *G01S 5/0252* (2013.01); *G06F 17/30241* (2013.01); *H04W 64/00* (2013.01)

(58) Field of Classification Search
CPC ............ G01S 5/0252; G06F 17/30241; G06F 17/30265; H04W 64/00
USPC .............................................. 707/724, 999.01
See application file for complete search history.

(56) References Cited

U.S. PATENT DOCUMENTS 6,839,560 B1 *    1/2005    Bahl .................... G01C 21/206
                                                            342/450

(Continued)

FOREIGN PATENT DOCUMENTS

GB    2 389 999 A    12/2003

OTHER PUBLICATIONS

Toyoma, K., et al., "Geographic Location Tags on Digital Images," *Proceedings of the 11th ACM International Conference of Multimedia MM '03*, Berkeley, CA, vol. 11, Nov. 2, 2003, pp. 156-166.
Office Action dated Jul. 4, 2012, in Chinese Patent Appl. No. 200980118077.6.
Amendment dated Nov. 2, 2012, in Chinese Patent Appl. No. 200980118077.6.

(Continued)

*Primary Examiner* — Jorge A Casanova
(74) *Attorney, Agent, or Firm* — Vierra Magen Marcus LLP

(57) ABSTRACT

A file creation method comprising: creating file content at a particular location and time using a portable device; and obtaining data from wireless communication devices detectable by the portable device at the particular location and time thereby to obtain a set of data. The set of data identifies or enables identification of the wireless communication devices. The method further comprises associating the set of data and time with the file content to enable subsequent analysis to determine the particular location using a time-dependent database.

17 Claims, 1 Drawing Sheet

(56) References Cited

U.S. PATENT DOCUMENTS

| | | | |
|---|---|---|---|
| 7,917,130 B1* | 3/2011 | Christensen | G06Q 20/20 455/414.4 |
| 2002/0184418 A1 | 12/2002 | Blight | |
| 2003/0134647 A1* | 7/2003 | Santhoff et al. | 455/456.1 |
| 2003/0220116 A1* | 11/2003 | Sagefalk | H04W 64/00 455/456.1 |
| 2005/0031047 A1* | 2/2005 | Maltsev et al. | 375/260 |
| 2005/0071320 A1* | 3/2005 | Chkodrov et al. | 707/3 |
| 2006/0240841 A1* | 10/2006 | Bhattacharya | G01S 5/021 455/456.1 |
| 2006/0271517 A1 | 11/2006 | Deloach, Jr. | |
| 2007/0030824 A1* | 2/2007 | Ribaudo et al. | 370/328 |
| 2007/0073937 A1 | 3/2007 | Feinberg et al. | |
| 2007/0081496 A1* | 4/2007 | Karge | G01C 21/206 370/331 |
| 2007/0167173 A1* | 7/2007 | Halcrow et al. | 455/456.2 |
| 2008/0004037 A1* | 1/2008 | Achlioptas | G01S 5/0236 455/456.1 |
| 2008/0186882 A1* | 8/2008 | Scherzer et al. | 370/310 |

OTHER PUBLICATIONS

Office Action dated Mar. 5, 2013, in Chinese Patent Appl. No. 200980118077.6.
Amendment dated May 10, 2013, in Chinese Patent Appl. No. 200980118077.6.
Office Action dated Aug. 29, 2013, in Chinese Patent Appl. No. 200980118077.6.
Office Action dated Jul. 23, 2013, in Japanese Patent Appl. No. 2011-510049.
Amendment dated Jan. 13, 2014, in Chinese Patent Appl. No. 200980118077.6.
Office Action dated May 16, 2014, in Chinese Patent Appl. No. 200980118077.6.
Amendment dated Dec. 24, 2013, in Japanese Patent Appl. No. 2011-510049.
Amendment dated Aug. 29, 2014, in Chinese Patent Appl. No. 200980118077.6.
Notification of Reexamination dated Feb. 3, 2016, in Chinese Patent Appl. No. 200980118077.6.

* cited by examiner

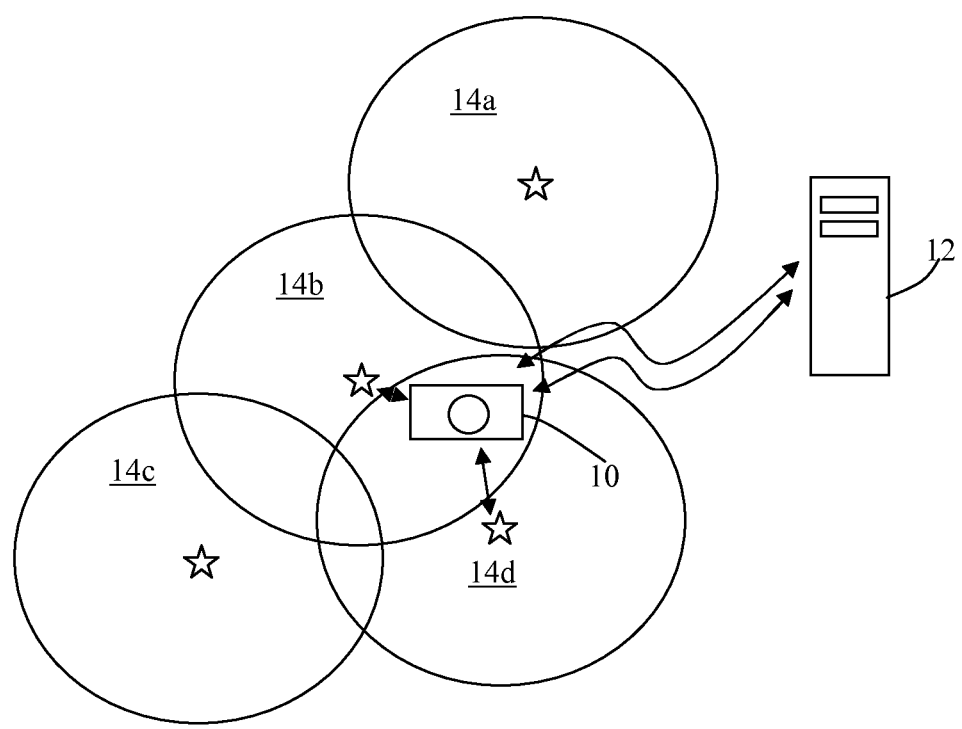

FILE CREATION METHOD AND SYSTEM

This is a non-provisional application claim the benefit of International app cation number PCT/GB2009/050525 filed May 15, 2009.

This invention relates to file creation methods, in particular with stamping of the file content with position information.

The use of the global positioning system is becoming increasingly widespread in domestic portable products. However, the GPS system requires significant processing capability in the portable device. Furthermore, in built up areas, there may often be a poor view of the sky so that GPS signals cannot always be obtained.

It is known to supplement GPS data with another positioning system data, so that the overall reliability can be improved. For example, triangulation based on mobile telephone base station signals can be employed as a slightly less accurate temporary positioning system to provide additional robustness to the GPS system.

It has previously been proposed to provide a location beacon database to function as a positioning system. If the beacons are WiFi access points (APs), such a database contains their MAC addresses, calculated estimated positions of the APs, and possibly their power profiles, i.e. what signal strength can be expected at various locations around the AP. The database is usually derived from a so-called wardrive.

Such a database is used when a user requires a position fix, especially when alternatives such as GPS are unavailable.

There are some applications in which a position fix is desired, but not for real time position determination, but instead to provide a record of the position at which a particular event took place. One main example of this is the so-called "geotagging" of photographs. This is used to enable a position identification to be associated with image files. This is of course of most interest for portable cameras, for example so that the location at which photographs were taken can be recorded. However, the processing involved can significantly increase the cost and power consumption of a camera, and there is a desire to address these issues.

According to the invention, there is provided a file creation method, comprising:

creating file content at a particular location and time using a portable device;

obtaining data from wireless communication devices detectable by the portable device at the particular location and time thereby to obtain a set of data, the set of data identifying or enabling identification of the wireless communication devices;

associating the set of data and time with the file content to enable subsequent analysis to determine the particular location using a time-dependent database.

This method uses a portable device simply to record data from wireless communication devices which can be detected, and the data can subsequently be used to derive the position at that time. This enables a low cost positioning system to be provided, with low processing power requirement on the portable device itself.

The time-dependent database enables the communication devices

The wireless communication devices are terrestrial devices, and preferably short range devices, namely with a range of less than 500 m, more typically less than 200 m.

The set of data can for example comprise a set of device identities (e.g. MAC addresses) of the wireless communication devices which have been detected. Alternatively, the set of data can comprise data which can be analysed to determine a set of device identities of the wireless communication devices which have been detected. This can be a recording of IF (Intermediate Frequency) data from the communication devices, without needing to read the MAC addresses from the data in the portable device.

Creating file content can for example comprise capturing an image and saving a corresponding image file. This may comprise photos or video clips. The invention can, however, be applied to non-image files, such as document files. For example, the location at which different updates were carried out may be of interest.

The method may further comprise recording the time and date and associating them with the file content. In addition, one or more of signal strength, signal to noise ratio, Doppler, and error rate of the wireless communication device transmission can be recorded and associated with the file content. This can enable a more accurate subsequent position fix.

The invention also provides a position stamping method, comprising:

creating a file using the method as claimed in any one of claims 1 to 7;

analysing the associated identities using a time-dependent database in order to derive a location based on the identities at the time associated with the file content; and creating a file comprising the file content and the derived location.

This method converts the associated set of identities into a location for appending to the file. The analysis can take place on a home PC, or on a server, or even on the portable device, but it does not need to take place while the portable device is running on its battery.

The invention also provides a file creation system, comprising:

a portable device for creating file content at a particular location;

a wireless receiver for detecting wireless communication signals and obtaining data from wireless communication devices detectable by the portable device at the particular location thereby to obtain a set of data, the set of data identifying or enabling identification of the wireless communication devices;

a processor for associating the set of data with the file content associating the set of data and time with the file content to enable subsequent analysis to determine the particular location using a time-dependent database.

This system implements the file creation method above. The portable device can comprise a camera, and the file content comprises an image or image sequence.

The invention also provides a position stamping system, comprising:

a file creation system of the invention; and a processor for:

analysing the associated identities using a time-dependent database in order to derive a location based on the identities at the time associated with the file content; and creating a file comprising the file content and the derived location.

A variation is for the portable device (or a second portable device) to periodically perform a sounding (i.e. a scan for beacons, recording those detected along with the time and date of the scan). This enables any time-stamped event, such as file creation, to be matched with a sounding that is near in time to that event.

Examples of the invention will now be described in detail with reference to the accompanying drawings, in which:

FIG. 1 shows an example system of the invention.

The invention provides a file creation method in which identities of wireless communication devices (or other information which can be used to derive those identities) detectable by a portable device are recorded, and these are subsequently used to determine the location.

FIG. 1 shows a system of the invention. A portable device, shown as a camera 10 has wireless receiving capability and is surrounded by four APs, with transmission areas 14a to 14d. The communication devices with ranges 14b and 14d are detectable by the portable device at its location, and these form a set of device identities. A database is provided as a remote server 12 in this example and stores the identities (and optionally other information) concerning the wireless communication devices. This information can either identify devices which are known to be detectable from defined reference locations, or else location and other information about the devices can be stored.

The server implements an algorithm for analysing the set of identities using the database content to determine the location of the portable device.

As mentioned above, a database of WiFi APs can be used to obtain a position fix. The process of finding a fix is typically as follows:

(i) scan for observable access points, (ii) look up reference data about these APs in the database, and (iii) derive the estimated user position by combining the AP position data, for example by triangulation.

This method of using scan data can also be employed in the system of the invention.

An alternative approach has been proposed (but not yet published) by the applicant. This involves analysing a set of identities using a database which stores the identities of wireless communication devices detectable from a plurality of reference locations. The database contains sighting results of a wardrive as in the prior art method. However, the location of the portable device is derived based on an analysis and processing of the reference locations (i.e. the locations at which wardrive readings were taken) rather than the deduced positions of the detected beacons.

In either approach, before the system can be operable, the reference information needs to be gathered. In one example, auxiliary positioning capability is used during a wardrive, to acquire sightings of beacons. Various items of data are recorded, such as time and date of sighting, latitude, longitude, altitude, MAC addresses, signal strength, signal to noise ratio, signal error rate, signal Doppler (high Doppler shifts may indicate a passing mobile router, e.g. a router on a passing a train; alternatively the user may be on a train). The position may be known by:

(i) A GPS based fix obtained during normal usage of the device by a user, (ii) A GPS based fix from a dedicated "wardrive", (iii) User input, (iv) A location fix from observations of previously identified beacons, (v) Inference from other information, for example distance and direction from a previously known location.

The database can include the data source(s), i.e. which of the above methods was used to gather the reference information. Optionally, the uncertainty of the estimated position may be estimated and recorded. The uncertainty may be small in the case of a GPS fix, or larger from alternative methods of position estimation.

From the reference information, a database is generated, again optionally together with uncertainty information. This database could be within the portable device itself, purely from its own scan results, or else (more preferably) the database information is shared with a database on a server as in the example shown. The processing may correspondingly be carried out on the device, or on the server.

The reference information can optionally be compressed, before or after forming the database.

A user operates the system, when in an unknown or uncertain location, simply by carrying out a scan to observe beacons. The observed communication device ("beacon") data is matched against the database.

A variety of algorithms is possible. However, all algorithms specific to this disclosure attempt to produce a fix, typically as latitude, longitude and altitude, and optionally with an estimate of the uncertainty. Optionally multiple outputs may be provided, for example with the most likely location, together with a larger region in which there is greater confidence that the search location is located.

In a first example, the algorithm finds one or more locations or location regions where the beacons seen by the device correspond to the beacons seen from a reference scan (i.e. the wardrive). Thus, a location is selected based on a reference location having the same set of beacon identities. A complete match is not essential to having a successful position fix, as beacons are not always active. Thus, the matching algorithm can perform a more intelligent comparison between the devices seen from the reference locations in the database and the devices seen by the scan.

A photograph may be submitted for geotagging many weeks or even months after being taken. In such a case, one is not so much interested in the WiFi landscape as it is at the most up-to-date time, but at a historical time: at a previous epoch. One option is to use a derived database that covers beacon reference data at approximately the epoch when the photo was taken. Any beacons appearing on the scene later than this, or known to have disappeared or moved from the scene later than this, will not help in obtaining a position fix, and may adversely affect the process of obtaining a fix, and in this way they are filtered out. Another option is to allow out-of-epoch beacon data to be considered in the fix algorithm in a qualified way. Out-of-epoch beacon data on beacons not observed by the portable device can safely be ignored. Out-of-epoch beacon data on beacons that are observed by the portable device must be sufficiently consistent with in-epoch data in order to not be rejected too; such a situation could arise if the beacon as a device existed all along, and was switched on when the photo was taken, but not when portable devices which fed the database were deployed. When such a case is identified, the out-of-epoch beacon could have its period of validity extended in the database to cover the earlier epoch too.

The invention provides this time-dependency in the database, and uses the beacon data as well as the time at which the data was captured to enable subsequent analysis to determine the particular location.

Once a position has been established, there are a number of ways this can be presented to the user. The position fix can be provided to an application or to the user. In the case of a server implementation, it will be communicated back to the device from the server, or communicated to another service. This may for example then lead to the display of the position on a map or satellite photo or terrain model, or to other Location Based Services.

The user or application may interact with the position fix to refine it, or to change it in the light of additional information. Such changes may optionally be reported back to the processor database.

Following the position fix (and following any update by the user or application) any additional information and scan results may optionally be added to the database; now that the location of the search is known the results can be regarded as a useful beacon scan. Thus, the database will be kept dynamically up to date.

The position determination method described above can be used in a camera to associate position information with a photo (or video). There is growing interest in this geo-tagging of photographs. At present, many photographs are tagged by hand, the tagger knowing the location where they are taken. Other methods involve performing a GPS fix, either locally in the camera or later from stored IF data.

The method described above can be used to append a position stamp to an image file or a photo clip, but without requiring a GPS system. Instead of using a GPS antenna and a GPS RF front-end, the method of the invention (whilst not excluding the use of GPS equipment) only requires the camera to be equipped to detect WiFi access points and/or other beacon radio signals. It will be seen that this gives an alternative method of producing a position fix.

In the example above, the portable device performs both the file creation and the capture of beacon data. Instead, the file creation device (e.g. camera) only needs to store the time and data, and a separate device can perform the sole function of storing the beacon data in a periodic manner. This separate device thus periodically perform a sounding (i.e. a scan for beacons, recording those detected along with the time and date of the scan). This enables any time-stamped event, such as file creation by the camera, to be matched with a sounding that is near in time to that event.

As mentioned above, GPS signals are not always present with sufficient quality. Indoors, the signals are weak or all but absent, depending on the thickness of walls and the material used (metal being completely opaque). Some signals may penetrate via reflected paths, which degrades the quality of a fix.

In urban environments, the view of the sky may be very limited, and there may not be sufficient satellites visible. The signals from some satellites may be present via reflections, possibly via several routes. All this militates against the ability to obtain (reliable) fixes. However, just where GPS position fixing is difficult or impossible, beacon signals such as those from WiFi access points may be abundant. In some cases, WiFi interfaces are standard equipment on digital cameras, and in this case no special hardware is required. The use of the method explained above can give energy consumption reduction compared to GPS approaches, especially where the fix is performed in the camera or an accessory.

Thus, it can be seen that the invention can also be used to enhance a GPS system, by providing a position fix based on access point detection when the GPS position fix is difficult.

Upon a user taking a photo, an image file is created containing that photo. The scanning for MAC addresses (and optionally other related data) of routers is carried out, those MAC addresses are stored and linked to the image file of the relevant photo. The time and date can also be recorded.

The method above obtains a position fix, which is appended to the image file. The method is analogously applicable to video clips, and alternative radio/microwave beacons with their own identification.

As for the general example above, the processing of MAC addresses (and/or GPS IF data) can be carried out locally in the camera if a local database is available, or on a PC at home, where a database is available local to the PC, or on a PC at home, with connectivity to a server. Instead, the processing may be carried out entirely remotely on a server, for example with the camera connecting directly to the server using its WiFi access.

In a system which combines GPS and the short range beacon scanning, scanning for beacons can be carried at precisely the same time as the start of IF GPS capture. Some beacons may provide accurate timing information, which could then be useful as assistance to a GPS fix.

The positioning information can be shared to improve the robustness. For example photo 1 may prompt production of a GPS fix and detection of certain MAC addresses which are otherwise unknown to the MAC address reference database. If a subsequent photo 2 cannot obtain a GPS fix, but sees the same, or some of the same MAC addresses as in photo 1, then the information from photo 1 can assist in the processing. The MAC address reference database may be updated with the MAC addresses from Photo 1 as previously explained, but this updating may be a separate nightly batch process. However, on processing photos in a bunch from one user, the new MAC addresses could be used in local processing and a position fix for photo 2 given. This could be implemented whatever order the photos are presented in, since photos that are not fixable in a first pass can be revisited when others have been processed.

The idea can be used in PCs, for locating the user when indoors. Indeed, the invention can be applied to any situation where a position fix is required, and the user has a device capable of detecting beacons and processing the observations against an accessible database. Users might include pedestrians, joggers, etc.

As mentioned above, the beacon based positioning system uses terrestrial rather than satellite beacons. These can be in any form, although the preferred implementation uses short range beacons such as WiFi nodes (i.e. APs). In general, beacons with a range of less than 200 m are used in domestic environments, and typically the range is less than 100 m, and even below 50 m in a building environment. Many such beacons can be found in a small geographical area, which assists the matching process of the invention.

Although the preferred implementation uses these short range beacons, the principles of the invention can be applied to other types of communication device, such as mobile phone cells (which have an identity in the form of a cell ID), radio/TV mast signals, DAB signals, WiMax (Worldwide Interoperability for Microwave Access) signals, Bluetooth and Zigbee signals. The wireless communication devices are typically RF devices, but again the principles of the invention can be applied to other types of signal, such as IR and sonic signals. These are all intended to be included within the term "wireless", which simply indicates that the signals can be received by a portable device without requiring a physical (i.e. wired) connection to the transmitting communication device.

The invention can be implemented with different types of device, namely a mixture of the different types of device outlined above.

Various modifications will be apparent to those skilled in the art.

The invention claimed is:

1. A file creation method, comprising:
providing a time-dependent database of reference data, the reference data comprising identities of wireless communication devices, reference locations associated with sightings of said devices, and times and dates associated with the sightings;

creating file content at a creation location, which is unknown, at a known creation time, using a portable device;

obtaining data identifying wireless communication devices detected by the portable device at the creation location at the known creation time;

associating the data and creation time with the file content; and analysing the data identifying the wireless communication devices detected by the portable device to determine the creation location using the reference data in the time-dependent database, wherein the creation location is determined based on the reference data for the creation location and wherein reference data comprising the identities of wireless communication devices which appeared at the creation location later than the creation time are filtered out.

2. The method as claimed in claim 1, wherein the data comprises a set of device identities of the detected wireless communication devices.

3. The method as claimed in claim 1, wherein the data comprises data which can be analyzed to determine a set of device identities of the detected wireless communication devices.

4. The method as claimed in claim 1, wherein creating file content comprises capturing an image and saving corresponding image file.

5. The method as claimed in claim 1, wherein the time associated with the file content comprises the time and date.

6. The method as claimed in claim 1, wherein the data further comprises signal strength, signal to noise ratio, Doppler, and error rate of a wireless communication device transmission.

7. The method as claimed in claim 1, wherein associating the set of data with the file content comprises embedding the data in the file structure.

8. The method as claimed in claim 1, wherein obtaining data from wireless communication devices detectable by the portable device is carried out by a second portable device.

9. The method of claim 1, comprising
creating a file comprising the file content and the creation location.

10. The method as claimed in claim 9, wherein the analysis is carried out:
by the portable device at a different time to obtaining the identities, or
on a computer system to which the file content and associated information is provided.

11. A file creation system, comprising:
a time-dependent database of reference data, the reference data comprising identities of wireless communication devices, reference locations associated with sightings of said devices, and times and dates associated with the sightings;
a portable device for creating file content at a creation location, which is unknown, at a known creation time;
a wireless receiver for detecting wireless communication signals and obtaining data identifying wireless communication devices at the creation location at the known creation time;
a processor for associating the data and the creation time with the file content; and
a processor configured to analyse the data identifying the wireless communication devices, which was obtained by the wireless receiver, to determine the creation location using the reference data in the time-dependent database wherein the creation location is determined based on the reference data, and wherein the reference data has the identities of wireless communication devices which appeared at the creation location later than the creation time filtered out.

12. The system as claimed in claim 11, wherein the device comprises a camera, and the file content comprises an image or image sequence.

13. The system as claimed in claim 11, wherein the wireless receiver is part of a second portable device, and wherein a first portable device provides time information with the file content.

14. The system of claim 11, comprising a processor adapted to
create a file comprising the file content and the creation location.

15. The method of claim 1 further including the step, prior to the providing step, of gathering reference data for the unknown location, the data enabling identification of wireless communication devices at the particular location at a previous time.

16. The system of claim 11 the processor adapted to gather historical reference data for the particular location, the historical data enabling identification of wireless communication devices at the particular location at a previous time.

17. A method, comprising:
creating a database of reference data about a set of wireless communication device identities, device times of sighting, and device locations thereby to obtain a historical set of data;
creating file content at an unknown creation location at a known creation time using a portable device;
obtaining data identifying wireless communication devices detected by the portable device at the unknown creation location at the known creation time;
associating the data for the known creation time with the file content;
selecting from the database historical data matching the known creation time of the file content; and
determining the location of creation of the file content based on the selected historical data, wherein the identities of wireless communication devices which appeared at the creation location later than the creation time are filtered out from the selected historical data.

* * * * *